United States Patent
Inoue et al.

(10) Patent No.: US 6,656,084 B2
(45) Date of Patent: Dec. 2, 2003

(54) APPARATUS FOR CONTROLLING CLUTCH BETWEEN VEHICLE ENGINE AND TRANSMISSION

(75) Inventors: Daisuke Inoue, Toyota (JP); Hideki Yasue, Toyota (JP); Katsumi Kono, Toyota (JP); Tadashi Tamura, Toyota (JP); Hiroji Taniguchi, Toyota (JP); Kenji Matsuo, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/834,955

(22) Filed: Apr. 16, 2001

(65) Prior Publication Data
US 2002/0014958 A1 Feb. 7, 2002

(30) Foreign Application Priority Data

May 22, 2000 (JP) ........................... 2000-149965

(51) Int. Cl.[7] ............................................. B60K 41/12
(52) U.S. Cl. ............................. 477/38; 477/37; 477/39; 477/45; 477/169; 477/180; 701/61; 701/67; 701/74; 192/85 R
(58) Field of Search ................................ 477/37, 38, 39, 477/44, 45, 46, 50, 62, 64, 169, 175, 180, 80, 176; 701/51, 53, 55, 61, 67, 68, 74, 85, 95; 192/3.3, 3.31, 3.58, 3.63, 85 A, 85 R, 109 F

(56) References Cited

U.S. PATENT DOCUMENTS

| | | | | |
|---|---|---|---|---|
| 4,735,113 A | * | 4/1988 | Yamamuro et al. ........... | 477/38 |
| 5,095,776 A | * | 3/1992 | Sato ............................. | 477/38 |
| 5,175,685 A | * | 12/1992 | Hibi ............................. | 701/60 |
| 5,203,233 A | * | 4/1993 | Hattori et al. ................ | 477/45 |
| 5,658,216 A | * | 8/1997 | Ochiai ......................... | 477/46 |
| 5,697,866 A | * | 12/1997 | Okahara ...................... | 477/169 |
| 5,743,368 A | * | 4/1998 | de Schepper et al. ... | 192/85 AA |
| 5,893,438 A | * | 4/1999 | Hasegawa et al. .......... | 192/3.3 |
| 5,950,789 A | * | 9/1999 | Hosseini et al. .......... | 192/85 R |
| 5,957,260 A | * | 9/1999 | Kunii ....................... | 192/85 R |
| 6,049,750 A | * | 4/2000 | Adachi et al. ................ | 701/51 |
| 6,056,094 A | * | 5/2000 | Sakai ......................... | 192/3.3 |
| 6,074,326 A | * | 6/2000 | Sakakibara et al. ......... | 477/169 |
| 6,099,435 A | * | 8/2000 | Halene et al. ................ | 477/62 |
| 6,179,107 B1 | * | 1/2001 | Hall, III .................. | 192/109 F |
| 6,314,357 B1 | * | 11/2001 | Kon et al. ..................... | 701/67 |
| 6,389,348 B1 | * | 5/2002 | Takagi et al. ................. | 701/58 |
| 6,397,703 B1 | * | 6/2002 | Iijima ........................ | 74/732.1 |

FOREIGN PATENT DOCUMENTS

JP              8-178016              7/1996

* cited by examiner

Primary Examiner—Rodney H. Bonck
Assistant Examiner—David D. Le
(74) Attorney, Agent, or Firm—Oblon, Spivak, McClelland, Maier & Neustadt, P.C.

(57) ABSTRACT

A control apparatus for feedback-controlling an engaging action of a clutch disposed between an engine and a transmission of an automotive vehicle, wherein an engaging force control device is operated upon an engaging action of the clutch, for determining a control amount and feedback-controlling the engaging action on the basis of the determined control amount such that the clutch is placed in a desired state of engagement, and a control amount limiting device is operated to limit the determined control amount when the determined control amount has changed to cause an engaging force of the clutch to be reduced.

8 Claims, 7 Drawing Sheets

APPARATUS FOR CONTROLLING CLUTCH BETWEEN VEHICLE ENGINE AND TRANSMISSION

This application is based on Japanese Patent Application No. 2000-149965 filed May 22, 2000, the contents of which are incorporated hereinto by reference.

BACKGROUND OF THE INVENTION

1. Field of the Invention

The present invention relates to a control apparatus for controlling an engaging force of a clutch disposed in series with a transmission in an automotive vehicle.

2. Discussion of Related Art

There is known a clutch disposed in series with a transmission in a power transmitting path between an engine and a drive wheel of an automotive vehicle. An example of this clutch is a clutch provided for directly connecting an input shaft and an output shaft of a torque converter or a fluid coupling.

In an automotive vehicle of the type indicated above, the clutch is controlled so as to gradually increase the engaging force of the clutch, in the process of an engaging action of the clutch from its fully released position to its fully engaged position, and the speed ratio of a continuously variable transmission of belt-and-pulley type is normally controlled in a feedback fashion while the clutch is held in its fully engaged position.

If the speed ratio of the transmission in the automotive vehicle described above is controlled during a feedback control of the clutch so as to gradually increase its engaging force in the process of its engaging action, however, the vehicle suffers from a drawback that the engaging force of the clutch and the speed ratio of the transmission cannot be adequately controlled due to an interference between the two controls. For instance, a change of the output speed of the clutch as a result of the control of the speed ratio of the transmission tends to cause reduced stability in the control of the engaging force of the clutch so as to control a difference between the speeds of the input and output shafts of the clutch. On the other hand, a change of the speed of the output shaft of the clutch as a result of the control of the engaging force tends to cause reduced stability in the control of the speed ratio of the transmission so as to permit the actual speed ratio to coincide with a desired or target value.

SUMMARY OF THE INVENTION

It is therefore an object of the present invention to provide a control apparatus for a clutch in an automotive vehicle, which control apparatus permits stable control of the engaging force of the clutch during the control of the speed ratio of a transmission of the vehicle.

The above object may be achieved according to the principle of this invention, which provides a control apparatus for feedback-controlling an engaging action of a clutch disposed between an engine and a transmission of an automotive vehicle, the control apparatus comprising: engaging force control means operable upon an engaging action of the clutch, for determining a control amount and feedback-controlling the engaging action on the basis of the determined control amount such that the clutch is placed in a desired state of engagement; and control amount limiting means operable when the determined control amount has changed to cause an engaging force of the clutch to be reduced, for limiting the determined control amount.

While the clutch is gradually engaged under the feedback control by the engaging force control means, the control amount must be changed by a relatively large amount to compensate for an external disturbance that causes the engaging force to be reduced. Where the external disturbance causes the engaging force to be increased, on the other hand, the amount of change of the control amount required to compensate for this external disturbance is comparatively small. In view of this fact, the control amount limiting means is arranged to limit the control amount determined by the engaging force control means, when the determined control amount has changed to cause the engaging force of the clutch to be reduced. This arrangement is effective to reduce an influence of a control of a speed ratio of the transmission on the feedback control of the engaging action of the clutch by the engaging force control means, so that the engaging force of the clutch can be controlled with a high degree of stability even while the speed ratio of the transmission is controlled.

According to one preferred form of the present invention, the transmission is a continuously variable transmission a speed ratio of which is continuously variable, and control apparatus further comprises shift control means operable while the engaging action of the clutch is feedback-controlled by the engaging force control means, for controlling the speed ratio of the continuously variable transmission such that an actual value of the speed ratio coincides with a target value. In this form of the control apparatus, the feedback control of the engaging action of the clutch by the engaging force control means and the control of the speed ratio of the continuously variable transmission by the shift control means are effected simultaneously.

According to another preferred form of the invention, the engaging force control means controls the engaging action of the clutch on the basis of an input shaft speed and an output shaft speed of the clutch. For instance, the engaging force control means controls the engaging action of the clutch such that a rate of change of a difference between the input and output shaft speeds of the clutch coincides with a predetermined target value. This arrangement permits adequate control of the engaging action or state of the clutch.

According to a further preferred form of the invention, the control amount limiting means permits the engaging force control means to control the engaging action of the clutch on the basis of the control amount as determined by the engaging force control means, when the control amount determined by the engaging force control means has changed to cause the engaging force of the clutch to be increased. This arrangement permits the engaging force of the clutch to be increased with a comparatively high degree of stability even while the speed ratio of the transmission is controlled at the same time.

According to a still further preferred form of this invention, the transmission is an automatic transmission having a plurality of operating positions having respective different speed ratios, and the control apparatus further comprises shift control means for automatically shifting the automatic transmission to a selected one of the operating positions. In this form of the invention, the feedback control of the engaging action of the clutch by the engaging force control means and the control of the shifting action of the automatic transmission by the shift control means to a selected one of the operating positions can be effected simultaneously.

According to a yet further preferred form of this invention, the automotive vehicle includes a torque converter incorporating a lock-up clutch as the clutch the engaging action of which is feedback-controlled by the engaging force control means, and the torque converter has an engaging fluid chamber and a releasing fluid chamber on opposite sides of the lock-up clutch. In this form of the invention, the lock-up clutch is operable between a fully engaged position and a fully released position, by flows of a working fluid into and from the engaging and releasing fluid chambers, and engaging force control means is arranged to determine as the control amount a desired difference between pressures of the working fluid in the engaging and releasing fluid chambers.

BRIEF DESCRIPTION OF THE INVENTION

The above and other objects, features, advantages and technical and industrial significance of the present invention will be better understood by reading the following detailed description of a presently preferred embodiment of the invention, when considered in connection with the accompanying drawings, in which.

DETAILED DESCRIPTION OF THE PREFERRED EMBODIMENTS

Figure 1:
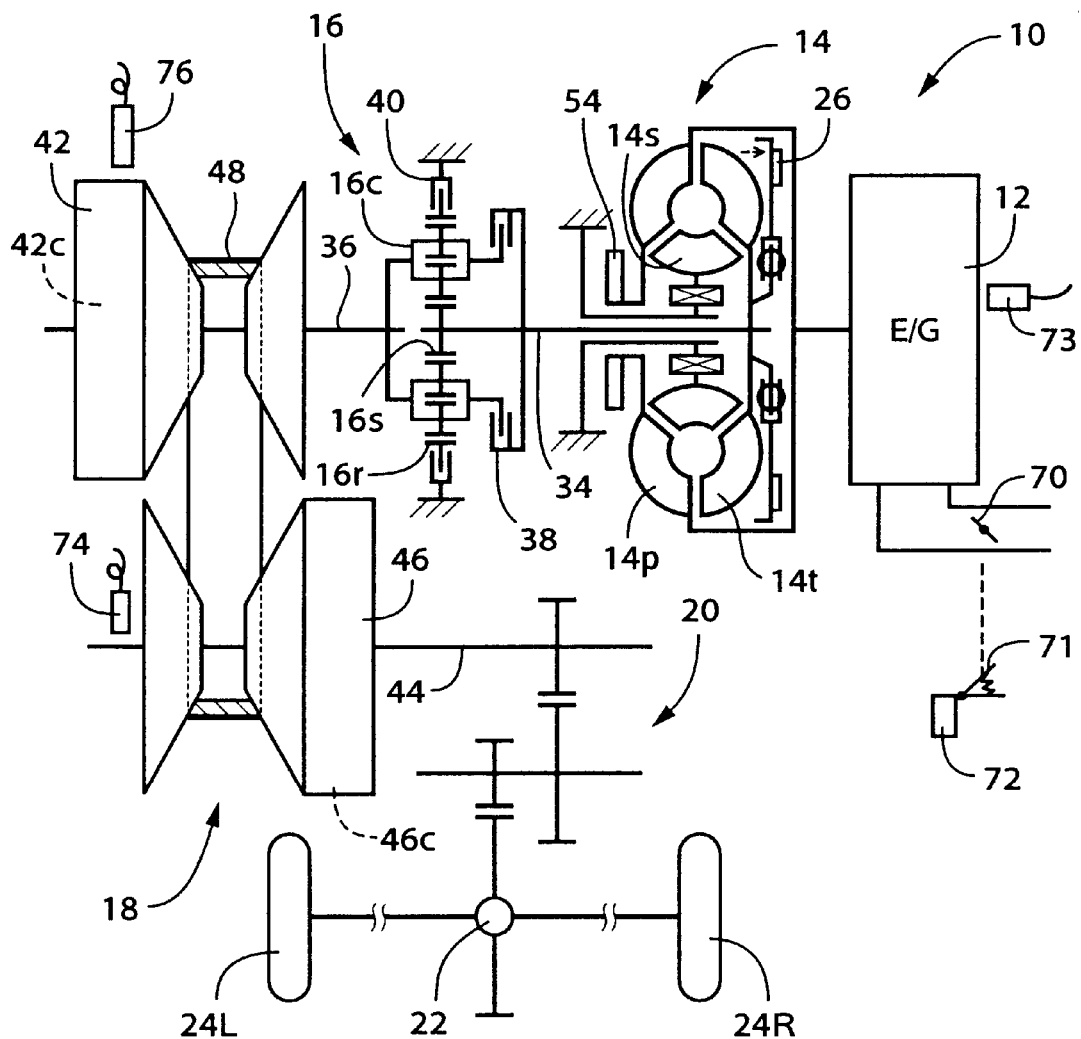
FIG. 1 is a schematic view illustrating a power transmitting system of an automotive vehicle, which is controlled by a control apparatus constructed according to one embodiment of this invention.

Referring to first to the schematic view of FIG. 1, there is shown a power transmitting system 10 of an automotive vehicle, which includes a continuously variable transmission 18 of belt-and-pulley type and which is controlled by a control apparatus constructed according to one embodiment of the present invention. For instance, the power transmitting system 10 is suitably used for a transverse FF (front-engine front-drive) vehicle. The vehicle is equipped with an internal combustion engine 12 as a drive power source. The power transmitting system 10 includes a torque converter 14, a forward-reverse switching device 16, the above-indicated belt-and-pulley type continuously variable transmission (CVT), a speed reduction gear device 20, and a differential gear device 22. An output of the engine 12 is transmitted to left and right drive wheels 24L, 24R of the vehicle through the torque converter 14, forward-reverse switching device 16, CVT 18, and speed reduction and differential gear devices 20, 22.

The torque converter 14 includes a pump impeller 14$p$ connected to a crankshaft of the engine 12, a turbine impeller 14$t$ connected to the forward-reverse switching device 16 through a turbine shaft 34, and a stationary impeller 14$s$ which is rotatably supported by a stationary member through a one-way clutch. The torque converter 14 is arranged to transmit rotary power via a working fluid. The torque converter 14 is provided with a lock-up clutch (direct coupling clutch) 26 which is disposed between the pump impeller 14$p$ (input rotary shaft member) and the turbine impeller 14$t$. When this lock-up clutch 26 is placed in its fully engaged position, the pump and turbine impellers 14$p$, 14$t$ are directly connected to each other by the lock-up clutch 26, and are rotated as a unit. The lock-up clutch 26 is disposed between the engine 12 and the continuously variable transmission 18, in series with the transmission 18, in a power transmitting path between the engine 12 and the drive wheels 24L, 24R.

The forward-reverse switching device 16 is a planetary gear device of double-pinion type, which includes a sun gear 16$s$ connected to the turbine shaft 34 of the torque converter 14, a carrier 16$c$ connected to an input shaft 36 of the continuously variable transmission 18, and a ring gear 16$r$ meshing with pinions which are rotatably supported by the carrier 16$c$. The forward-reverse switching device 16 is provided with a hydraulically operated frictional coupling device in the form of a forward-drive clutch 38 disposed between the carrier 16$c$ and the sun gear 16$s$, and another hydraulically operated frictional coupling device in the form of a reverse-drive brake 40 disposed between the ring gear 16$r$ and a housing of the switching device 16. The forward-drive clutch 38 is brought to its engaged position when a shift lever 67 is placed in one of forward-drive positions including a DRIVE position D, a SECOND position 2 and a LOW position L. In the engaged position of the forward-drive clutch 38, the forward-reverse switching device 16 is rotated as a unit, so that the turbine shaft 34 is directly connected to the input shaft 36 of the transmission 18, whereby a drive force is transmitted from the torque converter 14 to the left and right drive wheels 24L, 24R such that the drive wheels 24 are rotated in a direction for driving the vehicle in the forward direction. On the other hand, the reverse-drive brake 40 is brought to its engaged position when the shift lever 67 is placed in a reverse-drive position, namely, a REVERSE position R. When the reverse-drive brake 40 is placed in the engaged position while the forward-drive clutch 38 is placed in the released position, the input shaft 36 is rotated in a direction opposite to the direction of rotation of the turbine shaft 34, so that the drive force is transmitted to the drive wheels 24L, 24R for rotating the drive wheels 24 in a direction for driving the vehicle in the rearward direction.

The continuously variable transmission 18 of belt-and-pulley type includes an input-side variable-diameter pulley 42 mounted on the input shaft 36 indicated above, an output-side variable-diameter pulley 46 mounted on an output shaft 44, and a power transmitting member in the form of a transmission belt 48 which is held in engagement with V-grooves formed in the input- and output-side variable-diameter pulleys 42, 46. The effective diameters of the variable-diameter pulleys 42, 46 can be changed by respective hydraulic cylinders 42$c$, 46$c$ described below. An input force applied to the input shaft 36 is transmitted to the output shaft 44 through a force of friction between the transmission belt 48 and the opposite inner surfaces of the V-groove of each pulley 42, 44. The variable-diameter pulleys 42, 46 has the respective hydraulic cylinders 42c, 46c provided to change the effective axial widths of their V-grooves, for thereby changing the effective diameters of the pulleys 42, 46 at which the transmission belt 48 engages the V-grooves. The power transmitting system 10 is provided with a hydraulic control circuit 52 shown in FIG. 2. This hydraulic control circuit 52 includes a shift control valve device 50 (not shown in FIG. 2) as shown in FIG. 3. Fluid flows into and from the hydraulic cylinders 42c, 46c are controlled by the shift control valve device 50, to change the effective axial widths of the V-grooves of the pulleys 42c, 46c for thereby changing their effective diameters. Thus, the hydraulic cylinders 42c 46c can be controlled to continuously change a speed ratio $\gamma$ of the transmission 18. The speed ratio $\gamma$ is defined as a ratio of a rotating speed $N_{IN}$ of the input shaft 34 to a rotating speed $N_{OUT}$ of the output shaft 44, namely, is $\gamma = N_{IN}/N_{OUT}$.

A hydraulic pressure $P_B$ within the hydraulic cylinder 46c of the output-side variable-diameter pulley 46 determines a squeezing force by which the transmission belt 48 is widthwise squeezed by the variable-diameter pulley 46, and a tension of the transmission belt 48. Accordingly, the hydraulic pressure $P_B$ closely relates to a force of contact between the transmission belt 48 and the inner surfaces of the V-grooves of the pulleys 42, 44. In this respect, the hydraulic pressure $P_B$ may be called a belt tension control pressure, a belt squeezing force control pressure, and a belt contact force control pressure. The hydraulic pressure $P_B$ is controlled by a squeezing force control valve 56 (FIG. 3) provided in the hydraulic control circuit 52.

Figure 2:
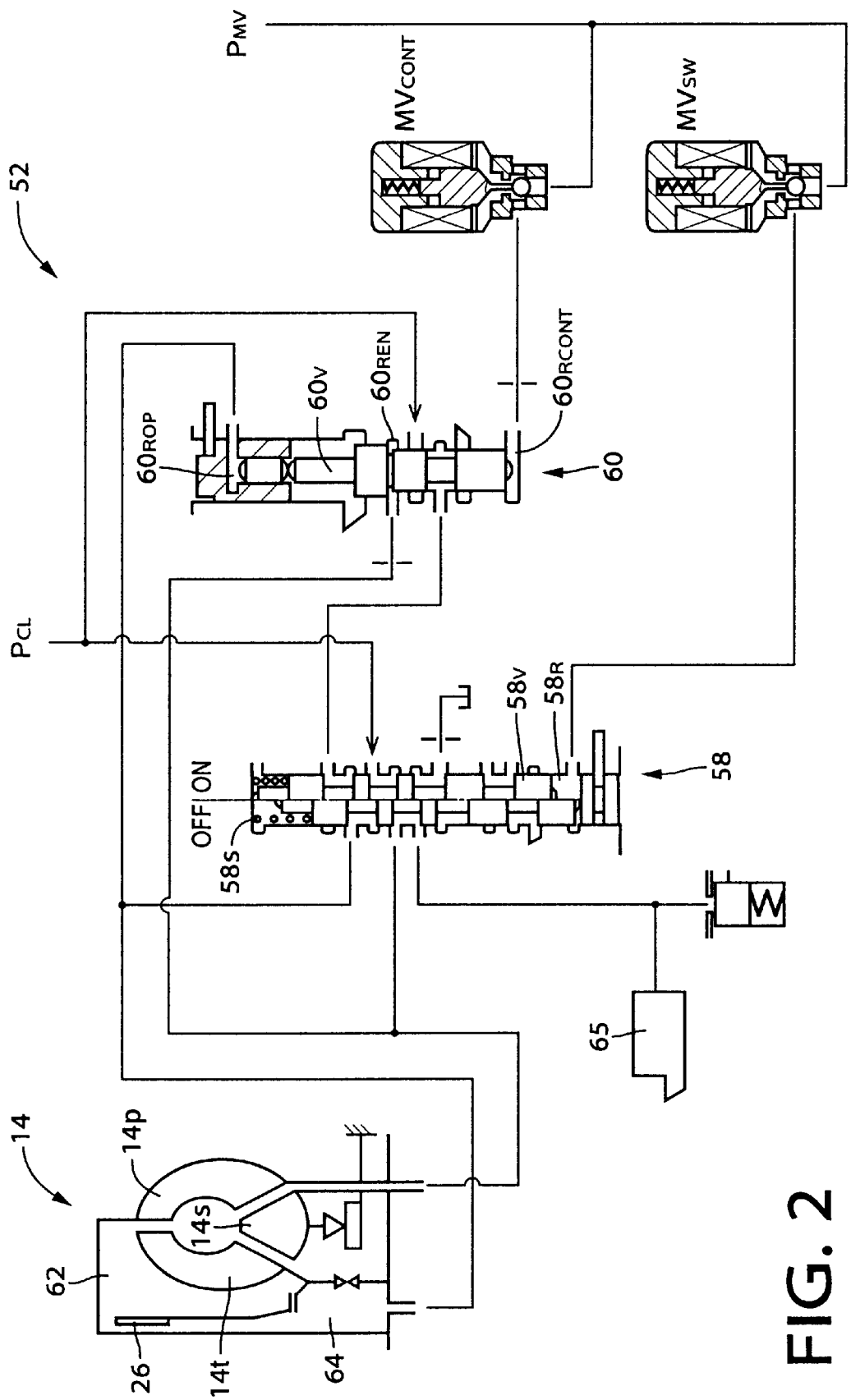
FIG. 2 is a view showing a portion of a hydraulic circuit provided on the vehicle, which portion is arranged to control an engaging force of a lock-up clutch provided in the power transmitting system of FIG. 1.
Figure 3:
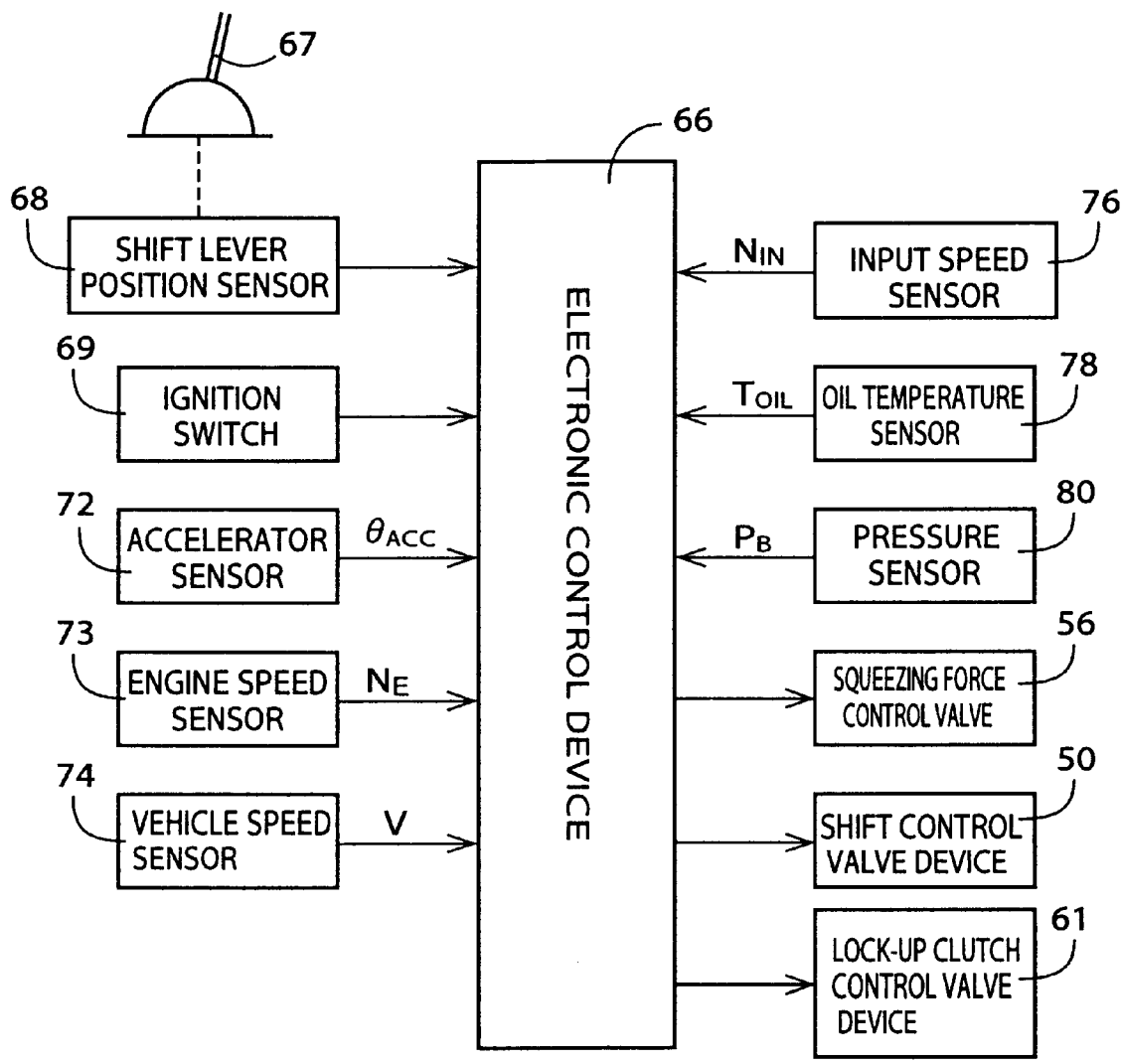
FIG. 3 is a block diagram showing an electric system provided on the vehicle and including an electronic control device which constitutes a major portion of the control apparatus.

FIG. 2 shows a portion of the hydraulic control circuit 52, which is adapted to control the lock-up clutch 26. A pressurized fluid delivered from a hydraulic pump 54 (FIG. 1) is regulated by a suitable pressure regulating valve (not shown) into a clutch pressure $P_{CL}$ such that the clutch pressure $P_{CL}$ corresponds to an output torque of the engine 12. As indicated in FIG. 2, the clutch pressure $P_{CL}$ is applied to a lock-up clutch switching valve 58. The pressurized fluid delivered from the hydraulic pump 54 is also regulated by another pressure regulating valve (not shown) into a predetermined constant electromagnetic valve pressure $P_{MV}$. As also indicated in FIG. 2, the electromagnetic valve pressure $P_{MV}$ is applied to a pair of electromagnetically operated valves, namely, a lock-up clutch switching electromagnetic valve $MV_{SW}$ and a lock-up clutch pressure regulating electromagnetic valve $MV_{CONT}$. Each of these electromagnetic valves $MV_{SW}$ and $MV_{CONT}$ is a three-way valve, and the valve $MV_{SW}$ is arranged to apply a control pressure to the lock-up clutch switching valve 58 for selectively placing the lock-up clutch 26 in the engaged or released position, while the valve $MV_{CONT}$ is arranged to apply a control pressure to a lock-up clutch control valve 60 for continuously changing an engaging force or torque of the lock-up clutch 26. It will be understood that the lock-up clutch switching valve 58, the lock-up clutch control valve 60, the lock-up clutch switching electromagnetic valve $MV_{SW}$ and the lock-up clutch pressure regulating electromagnetic valve $MV_{CONT}$ cooperate with each other to constitute a lock-up clutch control valve device 61 (FIG. 3) for controlling the lock-up clutch 26.

The torque converter has an engaging oil chamber 62 and a releasing oil chamber 64 which are formed on opposite sides of the lock-up clutch 26. The lock-up clutch 26 is brought to its engaged position when the fluid pressure in the engaging oil chamber 62 is made higher than that in the releasing oil chamber 64, and is brought to its released position when the fluid pressure in the releasing oil chamber 64 is made higher than that in the engaging oil chamber 62. A torque or force of engagement of the lock-up clutch 26 changes with a difference between the fluid pressures in the engaging and releasing oil chambers 62, 64.

The lock-up clutch switching valve 58 indicated above includes a spool $58_V$ which is movable between an engaging position for applying the clutch pressure $P_{CL}$ to the engaging oil chamber 62, and a releasing position for applying the clutch pressure $P_{CL}$ to the releasing oil chamber 64. The lock-up clutch switching valve 58 further includes a spring 58S biasing the spool $58_V$ toward the releasing position. The lock-up clutch switching valve 58 has an oil chamber $58_R$ provided to receive the control pressure from the lock-up clutch switching electromagnetic valve $MV_{SW}$, such that the received control pressure biases the spool 58V toward the engaging position. When the spool 58V is placed in its releasing position, the engaging oil chamber 62 is held in communication with a reservoir (not shown) through an oil cooler 65, so that the fluid is returned from the oil chamber 62 to the reservoir. On the other hand, the lock-up clutch control valve 60 includes a spool $60_V$ which has a position for draining the releasing oil chamber 64 and a position for receiving the clutch pressure $P_{CL}$. These positions of the spool $60_V$ are selectively established to regulate the pressure in the releasing oil chamber 64 while the lock-up clutch 26 is being engaged. The lock-up clutch control valve 60 has an oil chamber $60_{REN}$ and an oil chamber $60_{ROP}$ provided to receive the hydraulic pressures from the respective engaging and releasing oil chambers 62, 64, to generate a thrust force corresponding to a difference between the pressures in the oil chambers 62, 64. The generated thrust force acts on the spool $60_V$ and determines the engaging torque or force of the lock-up clutch 26. The lock-up clutch control valve 60 further has an oil chamber $60_{RCONT}$ adapted to receive the control pressure from the lock-up clutch pressure regulating electromagnetic valve $MV_{CONT}$, such that the received control pressure acts on the spool $60_V$ in a direction for increasing the difference between the pressures in the oil chambers $60_{REM}$ and $60_{ROP}$. The engaging force or torque of the lock-up clutch 26 is controlled to increase with an increase in the control pressure received from the electromagnetic valve $MV_{CONT}$.

As indicated in the block diagram of FIG. 3, the electronic control device 66 is adapted to receive: an output signal of a shift lever position sensor 68, which is indicative of a presently selected operating position $P_{SH}$ of the shift lever 67: an output signal of an ignition switch 69, which indicates whether the ignition switch 69 is on or off; an output signal of an accelerator sensor 72, which is indicative of an operating amount $\theta_{ACC}$ of an accelerator pedal 71, which in turn represents an angle of opening of a throttle valve 70 (FIG. 1); an output signal of an engine speed sensor 73, which is indicative of an operating speed $N_E$ of the engine 12; an output signal of a vehicle speed sensor 74, which is indicative of a running speed V of the vehicle (more precisely, the speed $N_{OUT}$ of the output shaft 44 of the transmission 18); an output signal of an input speed sensor 76, which is indicative of the speed $N_{IN}$ of the input shaft 36 of the transmission 18; an output signal of a temperature sensor 78, which is indicative of an operating temperature $T_{OIL}$ of the working fluid within the power transmitting system 10 (more precisely, within the transmission 18); an output signal of a pressure sensor 80, which is indicative of the pressure $P_B$ within the hydraulic cylinder 46c of the output-side variable diameter pulley 46, namely, the belt squeezing control pressure $P_B$.

The electronic control device 66 includes a so-called microcomputer incorporating a central processing unit (CPU), a read-only memory (ROM), a random-access memory (RAM), and an input-output interface. The CPU operates to process input signals according to control programs stored in the ROM while utilizing a temporary data storage function of the RAM, for executing a lock-up clutch engagement control routine for controlling the engaging action of the lock-up clutch 26, a shift control routine for controlling the shifting action of the transmission 18, and a squeezing force control routine for controlling the squeezing force of the belt 48 of the transmission 18. As described in detail by reference to the flow chart of FIG. 6, the lock-up clutch engagement control routine is executed, upon engagement of the lockup clutch 26, such that a rate of change of the engaging force of the lock-up clutch 26 coincides with a desired or target value, by controlling the lock-up clutch pressure regulating electromagnetic valve $MV_{CONT}$ in a feedback fashion such that a rate of change $dN_{SLIP}$ of a speed difference $N_{SLIP}$ between the speeds of the pump impeller 14p (input rotary shaft member) and the turbine impeller 14t (output rotary shaft member) of the torque converter 14 coincides with a desired or target value $dN_{slip}t$.

Figure 4:
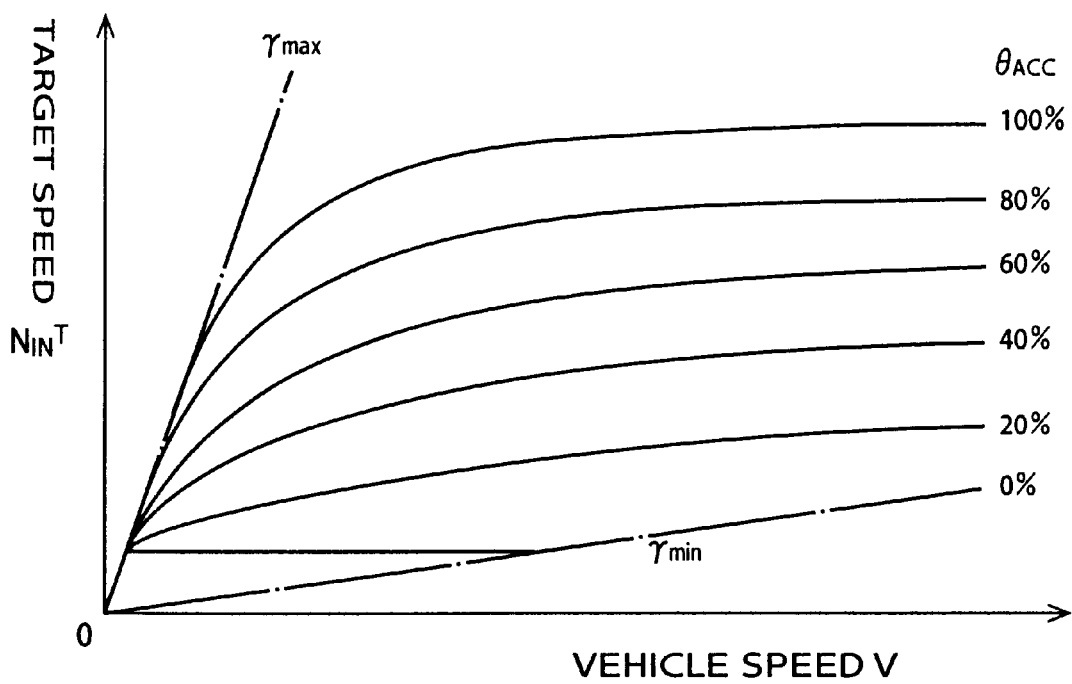
FIG. 4 is a graph indicating a relationship among a desired input speed of a transmission in the power transmitting system, an operating amount of an accelerator pedal, and a running speed of the vehicle, which relationship is used to determine the desired input speed in the control of the transmission by the electronic control device of FIG. 3.

In the shift control routine, the electronic control device 66 calculates a target value $N_{IN}T$ of the speed $N_{IN}$ of the input shaft 36 of the transmission 18, on the basis of the detected operating amount $\theta_{ACC}$ of the accelerator pedal 71 (indicative of the angle of opening of the throttle valve 70) and the detected vehicle running speed V (speed $N_{OUT}$ of the output shaft 44), and according to a predetermined relationship among the target value $N_{IN}T$, the operating amount $\theta_{ACC}$ and the running speed V. An example of this relationship is represented by a data map stored in the ROM of the electronic control device 66, as shown in FIG. 4. The electronic control device 66 controls the shift control valve device 50 in a feedback fashion, to control a rate of flow of the fluid into or from the hydraulic cylinder 42c of the input-side variable-diameter pulley 42, so that the detected input shaft speed $N_{IN}$ coincides with the calculated target value $N_{IN}T$. The predetermined relationship shown in FIG. 4 by way of example is formulated so that the engine 12 is operated to follow an optimum curve which permits an optimum output of the engine 12 and minimize the fuel consumption by the engine 12. In the graph of FIG. 4, "γmax" and "γmin" represent a maximum value and a minimum value of the speed ratio γ of the transmission 18.

In the squeezing force control routine, the electronic control device 66 calculates a target value of the squeezing force control pressure $P_B$ of the belt 48, on the basis of the operating amount $\theta_{ACC}$ of the accelerator pedal 71 corresponding to an actual input torque $T_{IN}$ or transmission torque of the transmission 18, and the actual speed ratio value γ of the transmission 18, and according to a predetermined relationship among the squeezing force control pressure $P_B$, input torque $T_{IN}$ and speed ratio γ. This predetermined relationship, which is represented by a data map stored in the ROM of the electronic control device 66, is formulated so that the actual pressure $P_B$ within the hydraulic cylinder 46c is high enough to establish the squeezing force of the belt 48. The electronic control device 66 controls the squeezing force control valve 56 provided in the hydraulic control circuit 52, so that the hydraulic pressure $P_B$, namely, the squeezing force control pressure $P_B$ coincides with the calculated target value.

Figure 5:
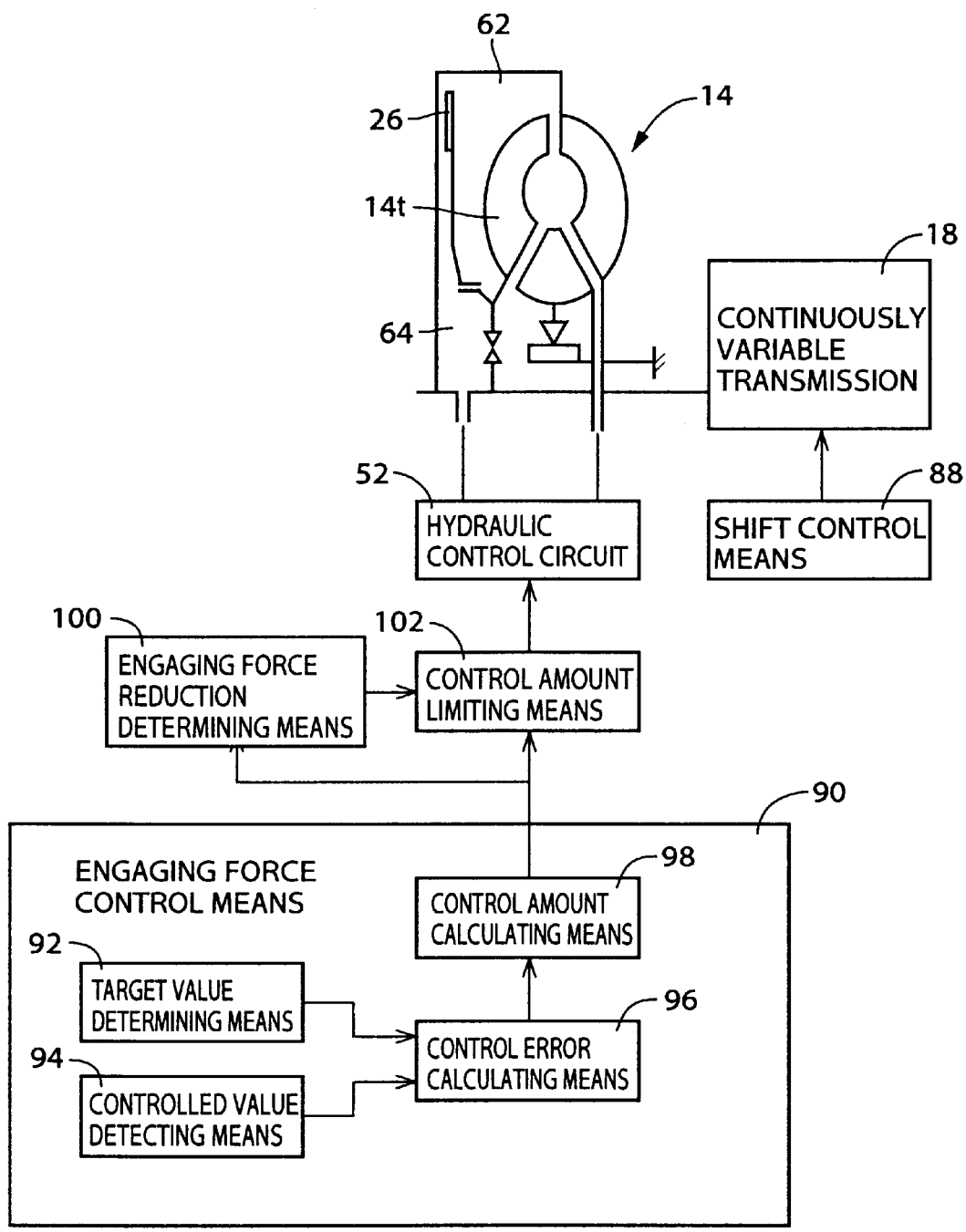
FIG. 5 is a block diagram for explaining major control functions of the electronic control device of FIG. 3.

Referring next to the block diagram of FIG. 5 showing major functions of the electronic control device 66, such as a function of controlling the engaging force of the lock-up clutch 26, the electronic control device 66 includes shift control means 88 and engaging force control means 90. The shift control means 88 is operable during running of the vehicle, to determine the target value $N_{IN}T$ of the input speed $N_{IN}$ of the transmission 18 on the basis of the detected operating amount $\theta_{ACC}$ of the accelerator pedal 71 and the detected vehicle running speed V, and according to the predetermined relationship as indicated in FIG. 4 by way of example, and to feedback-control the shift control valve device 50 so that the actual input speed $N_{IN}$ coincides with the determined target value $N_{IN}T$. The feedback control by this shift control means 88 is effected simultaneously with the engaging force control by the engaging force control means 90 to control the engaging force of the lock-up clutch 26, which will be described.

The engaging force control means 90 is operated upon engagement of the lock-up clutch 26, to control the lock-up clutch 26 in a desired engaged state, more specifically, to feedback-control the lock-up clutch pressure regulating electromagnetic valve $MV_{CONT}$ such that the rate of change $dN_{SLIP}$ of the difference $N_{SLIP}$ between the speeds of the pump and turbine impellers 14p, 14t (input and output shaft members) coincides with the predetermined target value $dN_{SLIP}t$. As indicated in FIG. 5, this engaging force control means 90 incorporates target value determining means 92, controlled value detecting means 94, control error calculating means 96, and control amount calculating means 98.

The target value determining means 92 indicated above is operated upon initiation of an engaging action of the lock-up clutch 26, to determine a target value of a rate of engagement of the lock-up clutch 26, namely, a rate of increase of the engaging force of the lock-up clutch 26, more specifically, the above-indicated target value $dN_{SLIP}t$ of the rate of change (rate of reduction) $dN_{SLIP}$ of the difference $N_{SLIP}$ between the speeds of the pump impeller 14p (input rotary shaft member) and turbine impeller 14t (output rotary shaft member) of the torque converter 14. This target rate of change $dN_{SLIP}t$ is used to control the engaging action of the lock-up clutch 26, so as to reduce an engaging shock of the lock-up clutch 26. The target rate of change $dN_{SLIP}t$ may be a constant value, or may be determined on the basis of the detected running condition of the vehicle such as the detected running speed V (km/h) and operating amount $\theta_{ACC}$ of the accelerator pedal 71, and according to a predetermined relationship among the target rate of change $dN_{SLIP}t$, the running speed V and the operating amount $\theta_{ACC}$, which relationship is represented by a data map stored in the ROM of the electronic control device 66. The controlled value detecting means 94 is adapted to detect a controlled value in the form of the rate of change or reduction $dN_{SLIP}$ of the actual speed difference $N_{SLIP}$, (=$N_E$−$N_{IN}$) while the engaging force of the lock-up clutch 26 is being controlled. The control error calculating means 96 is adapted to calculate a control error ($dN_{SLIP}t$−$dN_{SLIP}$) which is a difference between the target value $dN_{SLIP}t$ and the actual value $dN_{SLIP}$ of the speed difference $N_{SLIP}$.

The control determining means 98 indicated above is adapted to calculate a feedback control amount dPlufb that eliminates the control error ($dN_{SLIP}t$−$dN_{SLIP}$), according to the following equation (1), calculate a control amount dPlu= dPlufb+dPlusu according to the following equation (2) including a predetermined sweep-up amount dPlusu (basic gradient), and calculate a control pressure Plu for the lock-up clutch 26 (which control pressure is a difference between the pressures in the engaging and releasing oil chambers 62, 64) according to the following equation (3). The equations (1), (2) and (3) are stored in the ROM of the electronic control device 66.

$$Dplufb = Ga \times (dN_{SLIP}t - dN_{SLIP}) \quad (1)$$

$$dPlu = dPlu = dPlufb + dPlusu \quad (2)$$

$$Plu = Plu + dPlu \quad (3)$$

In the above equation (1), "Ga" represents a feedback gain. The sweep-up amount dPlusu in the above equation (2) functions as a feed-forward value for optimizing the torque capacity of the lock-up clutch 26. In the above equation (3), "Plu" to be added to the control amount dPlu calculated according to the equation (2) is the last value of the control pressure (difference between the pressures of the oil chambers 62, 64).

The electronic control device 66 further includes engaging force reduction determining means 100 and control amount limiting means 102. The engaging force reduction determining means 100 is adapted to determine whether the control amount dPlu calculated according to the above equation (2) causes the engaging force of the lock-up clutch 26 or a rate of change of the engaging force to be reduced, for instance, whether the calculated control amount dPlu is a negative value. The control amount limiting means 102 is operated when the engaging force reduction determining means 100 has determined that the calculated control amount dPlu causes a reduction of the engaging force. The control amount limiting means 102 is adapted to limit the feedback control amount dPlufb or control amount dPlu indicated above, for permitting the engaging force of the lock-up clutch 26 to change with a high degree of stability, irrespective of a change in the rotating speed of the input shaft 36 (turbine shaft 34) by the feedback control of the speed ratio γ of the transmission 18 by the shift control means 88. For instance, the feedback control amount dPlufb is zeroed by the control amount limiting means 102.

Referring to the flow chart of FIG. 6, there will be described the lock-up clutch engagement control routine executed by the electronic control device 66. This control routine is initiated with step SA1 to calculate the feedback control amount dPlufb on the basis of the feedback gain Ga and the actual control error ($dN_{SLIP}t - N_{SLIP}$), and according to the above equation (1). Then, the control flow goes to step SA2 to calculate the control amount dPlu on the basis of the calculated feedback control amount dPlufb and the predetermined sweep-up amount dPlusu, and according to the above equation (2). Step SA2 is followed by step SA3 corresponding to the engaging force reduction determining means 100, to determine whether the calculated control amount dplu is a negative value. If a negative decision (NO) is obtained in step SA3, the control flow goes to step SA5 while skipping step SA4, to calculate the control pressure Plu in the present control cycle, according to the above equation (3), that is, by adding the control pressure Plu in the last control cycle to the control amount dPlu calculated in step SA2. If an affirmative decision (YES) is obtained in step SA3, the control flow goes to step SA4 in which the control amount dPlu calculated according to the above equation (2) is ignored and zeroed, so that the control pressure Plu in the present control cycle remains equal to that in the last control cycle.

Figure 7:
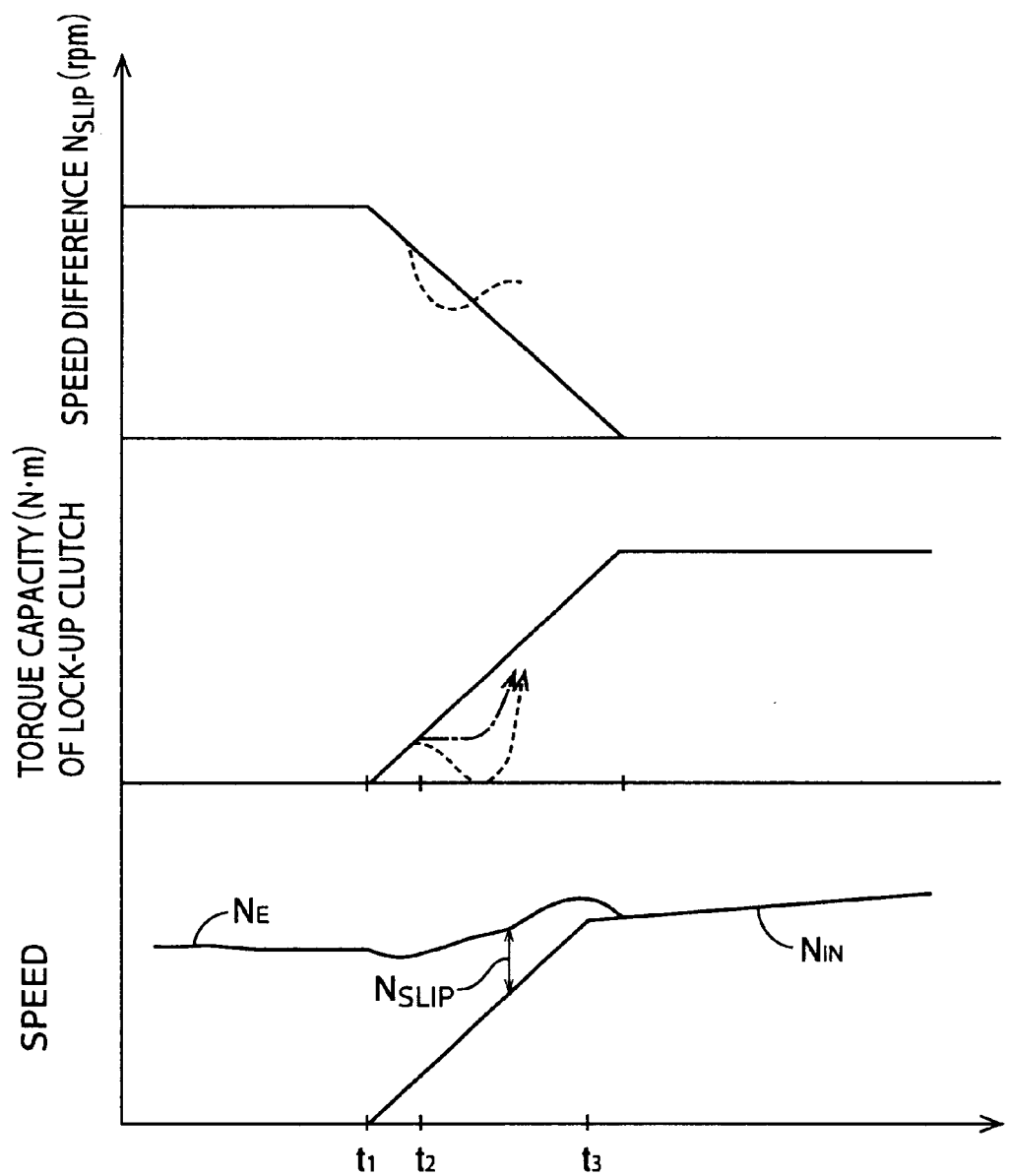
FIG. 7 is a time chart indicating changes in various parameters associated with the transmission and lock-up clutch while the transmission and lock-up clutch are controlled by the electronic control device.

The time chart of FIG. 7 shows an engaging action of the lock-up clutch 26, which is initiated at a point of time t1 and completed at a point of time t3. In a transient state of the lock-up clutch 26, that is, during the engaging action indicated by solid lines in the time chart, the rate of change of the engaging force of the lock-up clutch 26 is feedback-controlled by the engaging force control means 90, so as to coincide with the target value, for minimizing the engaging shock of the lock-up clutch 26. If the speed difference $N_{SLIP}$ is abruptly reduced (as a result of a sudden rise of the input shaft speed $N_{IN}$) at a point of time t2, as indicated by broken line in the uppermost graph in FIG. 7, the control amount dPlu is zeroed so that the control pressure Plu in the present control cycle is kept equal to that in the last control cycle, as described above. Accordingly, the torque capacity of the lock-up clutch 26 will not be abruptly reduced as indicated by one-dot chain line in the intermediate graph in FIG. 7, and the engaging action of the lock-up clutch 26 can be feedback-controlled with high stability by the engaging force control means 90.

Broken line in the intermediate graph in FIG. 7 indicates an abrupt reduction of the torque capacity of the lock-up clutch 26, which would take place in the conventional control arrangement in which the control amount dPlu is not limited when the engaging force of the lock-up clutch 26 is reduced. Such an abrupt reduction of the torque capacity of the lock-up clutch 26 would cause instability of the feedback control of the engaging force of the lock-up clutch 26. In the transient period between the points of time t1 and t3 in which the lock-up clutch 26 is gradually engaged under the feedback control by the engaging force control means 90, the control pressure Plu must be changed by a relatively large amount to compensate for an external disturbance that causes the engaging force to be reduced, while the amount of change of the control pressure Plu required to compensate for an external disturbance that causes the engaging force to be increased is comparatively small.

As described above, the electronic control apparatus according to the present embodiment including the electronic control device 66 is arranged to activate the control amount limiting means 102 (implement step SA4) to limit the calculated control amount dPlu when the control amount dPlu calculated by the engaging force control means 90 (corresponding to steps SA1, SA2, SA5) has changed to reduce the engaging force of the lock-up clutch 26. This arrangement makes it possible to reduce an influence of the control of the speed ratio γ of the transmission 18 by the shift control means 88 on the feedback control by the engaging force control means 90. Thus, there does not arise a control interference between the control of the speed ratio of the transmission 18 by the shift control means 88 and the control of the engaging force of the lock-up clutch 26 by the engaging force control means 90.

In the present embodiment, the engaging force control means 90 is arranged to control the engaging action of the lock-up clutch 26 on the basis of the input shaft speed of the lock-up clutch 26 (engine speed $N_E$) and the output shaft speed of the lock-up clutch 26 (speed $N_{IN}$ of the input shaft 36 of the transmission 18). In the illustrated embodiment, the engaging force of the lock up clutch 26 is controlled so that the rate of change $dN_{SLIP}$ of the difference $N_{SLIP}$ between the input and output shaft speeds of the lock-up clutch 26 (between the engine speed $N_E$ and the speed $N_{IN}$ of the input shaft 36) coincides with the predetermined target value $dN_{SLIP}t$. The present arrangement permits adequate control of the engaging state or action of the lock-up clutch 26.

Further, the control amount limiting means 102 is arranged not to limit the control amount dPlu when the control amount dPlu calculated by the engaging force control means 90 has changed to increase the engaging force of the lock-up clutch 26 during its engaging action, while the control amount limiting means 102 limits the control amount dPlu when the calculated control amount dPlu has changed to reduce the engaging force, as described above.

Accordingly, the lock-up clutch 26 can be brought to its fully engaged state with its engaging force being increased with a comparatively high degree of stability, even while the speed ratio of the transmission 18 is feedback-controlled by the shift control means 88.

While the presently preferred embodiment of this invention has been described in detail by reference to the accompanying drawings, it is to be understood that the invention may be otherwise embodied.

The lock-up clutch 26 provided in the power transmitting system 10 of the vehicle in the illustrated embodiment may be any type of clutch such as a wet-type multiple-disc clutch or an electromagnetic clutch, as well as a dry-type single-disc clutch. While the lock-up clutch 26 is controlled by the electronic control device 66 in the illustrated embodiment, the electronic control device 66 may be adapted to control the forward-drive clutch 38 of the forward-reverse switching device 16 disposed between the engine 12 and the belt-and-pulley type continuously variable transmission 18. Namely, the principle of the present invention is equally applicable to any clutch disposed between the engine 12 and the continuously variable transmission 18.

The control amount limiting means 102 adapted to limit the control amount dPlu when the control amount dPlu causes a decrease of the engaging force of the lock-up clutch 26 may be adapted to limit the control amount dPlu at least during the feedback control of the transmission 18 by the shift control means 88.

In the illustrated embodiment, the control amount limiting means 102 is adapted to zero the control amount dPlu when the control amount dPlu causes a decrease of the engaging force of the lock-up clutch 26. However, the control amount limiting means 102 may be adapted to reduce the control amount dPlu rather than zero the control amount dPlu.

In the illustrated embodiment, the engaging force control means 90 is adapted to feedback-control the engaging action of the lock-up clutch 26 such that the rate of change $d_{NSLIP}$ of the difference $N_{SLIP}$ between the speed of the pump impeller 14$p$ (input rotary shaft member) and the speed of the turbine impeller 14$t$ (output rotary shaft member) of the torque converter 14 coincides with the predetermined value $dN_{SLIP}t$. However, the engaging force control means 90 may be adapted to control the engaging action of the lock-up clutch 26 such that the rate of change $dN_{SLIP}$ coincides with a target value which varies as a function of the time.

Figure 6:
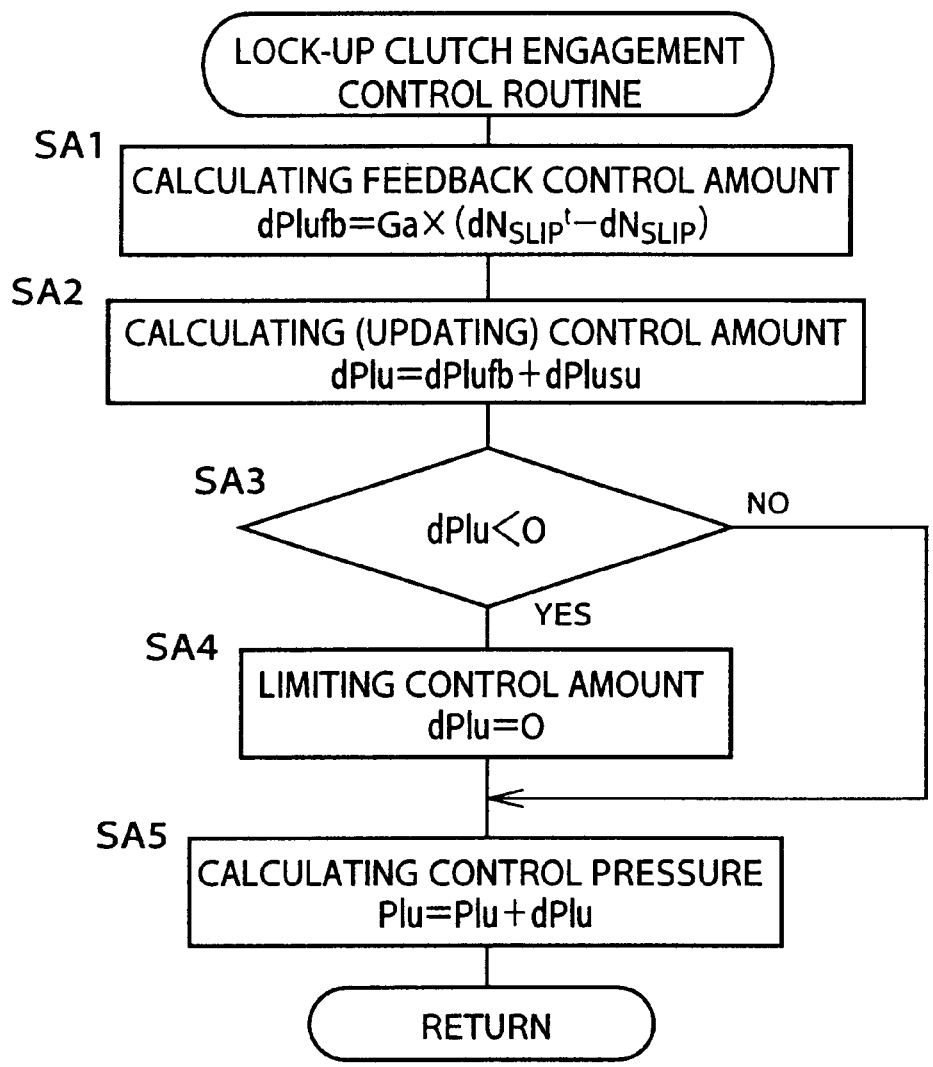
FIG. 6 is a flow chart illustrating a control routine executed by the electronic control device of FIG. 3 to control the engaging action of the lock-up clutch.

While step SA3 of the lock-up clutch engagement control routine illustrated in the flow chart of FIG. 6 is formulated to determine whether the control amount dPlu is smaller than zero, this step SA3 may be modified to determine whether the feedback control amount dPlufb is smaller than zero.

Although the lock-up clutch 26 is disposed between the engine 12 and the continuously variable transmission 18 of belt-and-pulley type, the lock-up clutch 26 may be disposed between the engine 12 and an automatic transmission having a plurality of operating positions having respective different speed ratios.

It is to be understood that the present invention may be embodied with various other changes, modifications and improvements, which may occur to those skilled in the art, in the light of the technical teachings of the present invention which have been described.

What is claimed is:

1. A control apparatus for feedback-controlling an engaging action of a clutch disposed between an engine and a transmission of an automotive vehicle, said control apparatus compnsing:

engaging force control means operable upon an engaging action of said clutch, for determining a control amount based upon feedback control of the engagement of the clutch such that said clutch is placed in a desired state of engagement;

control amount limiting means operable when said determined control amount has changed to cause an engaging force of said clutch to be reduced, for limiting said determined control amount.

2. A control apparatus according to claim 1, wherein said transmission is a continuously variable transmission a speed ratio of which is continuously variable, said control apparatus further comprising shift control means operable while said engaging action of said clutch is feedback-controlled by said engaging force control means, for controlling the speed ratio of said continuously variable transmission such that an actual value of the speed ratio coincides with a target value.

3. A control apparatus according to claim 1, wherein said engaging force control means controls the engaging action of said clutch on the basis of an input shaft speed and an output shaft speed of said clutch.

4. A control apparatus according to claim 3, wherein said engaging force control means controls the engaging action of said clutch such that a rate of change of a difference between said input and output shaft speeds of said clutch coincides with a predetermined target value.

5. A control apparatus according to claim 1, wherein said control amount limiting means permits said engaging force control means to control the engaging action of said clutch on the basis of said control amount as determined by said engaging force control means, when said control amount determined by said engaging force control means has changed to cause the engaging force of the clutch to be increased.

6. A control apparatus according to claim 1, wherein said transmission is an automatic transmission having a plurality of operating positions having respective different speed ratios, said control apparatus further comprising shift control means for automatically shifting said automatic transmission to a selected one of said operating positions.

7. A control apparatus according to claim 1, wherein said automotive vehicle includes a torque converter incorporating a lock-up clutch as said clutch the engaging action of which is feedback-controlled by said engaging force control means, said torque converter having an engaging fluid chamber and a releasing fluid chamber on opposite sides of said lock-up clutch, said lock-up clutch being operable between a fully engaged position and a fully released position, by flows of a working fluid into and from said engaging and releasing fluid chambers, said engaging force control means determining as said control amount a desired difference between pressures of the working fluid in said engaging and releasing fluid chambers.

8. A control apparatus according to claim 1, wherein said control amount limiting means limits said determined control amount such that the determined control amount is smaller when said determined control amount has changed to cause said engaging force of said clutch to be reduced, than when said determined control amount has changed to cause said engaging force to be increased.

* * * * *